June 29, 1943.   L. E. HEASLEY ET AL   2,323,038
DAMPER REGULATOR
Filed Jan. 13, 1941
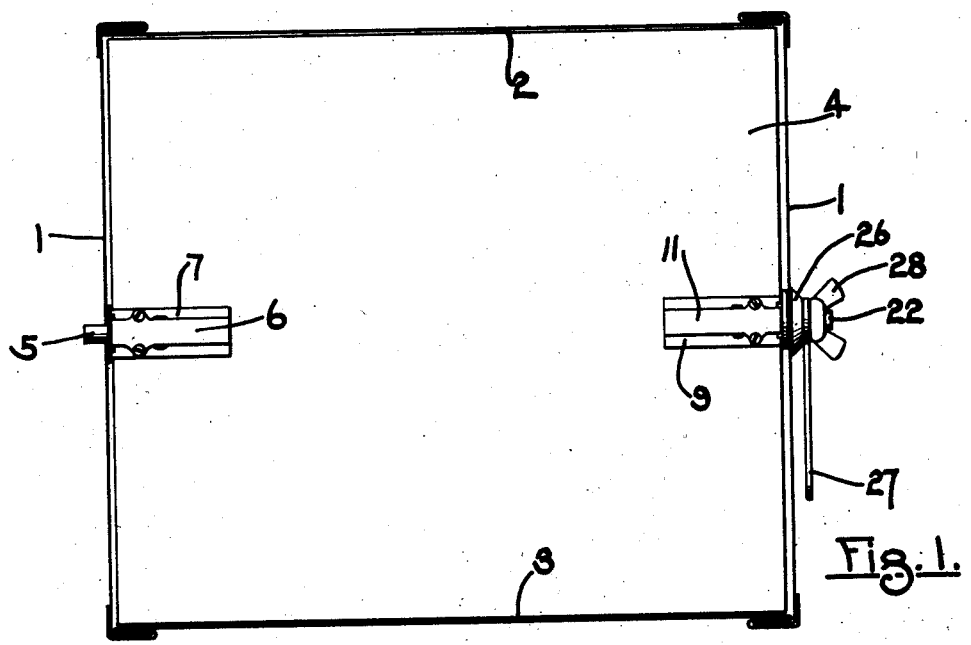
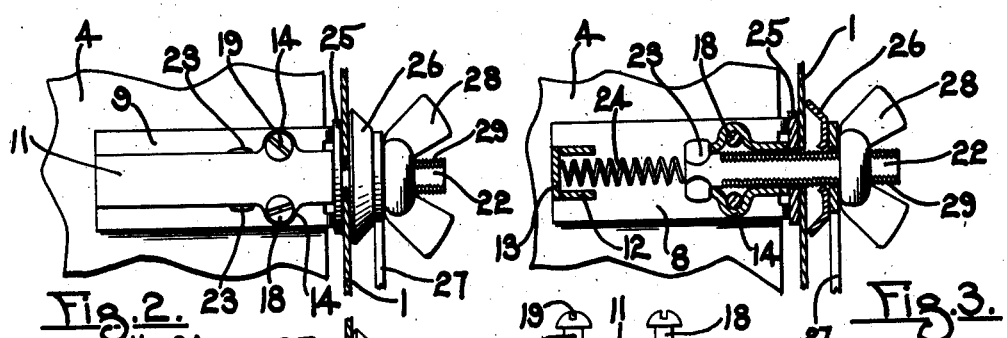
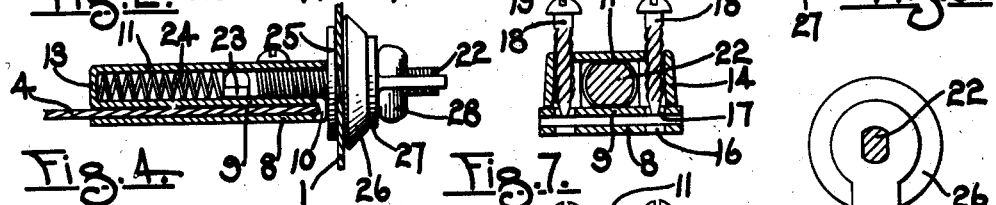
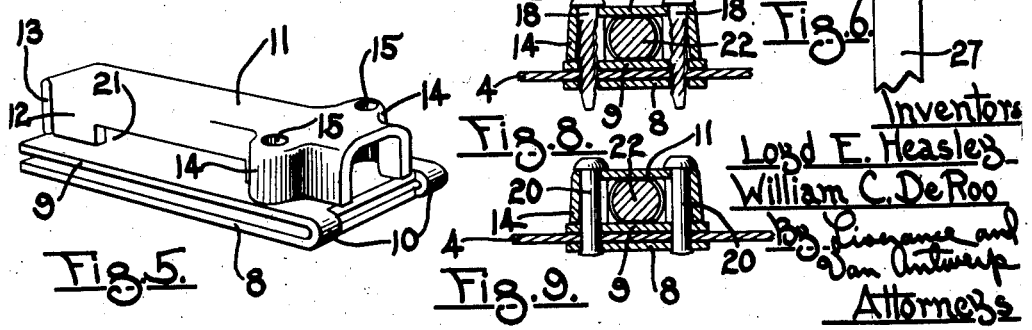
Inventors
Loyd E. Heasley
William C. DeRoo
Attorneys Patented June 29, 1943

2,323,038

UNITED STATES PATENT OFFICE 2,323,038

DAMPER REGULATOR

Loyd E. Heasley and William C. De Roo, Holland, Mich., assignors to Hart & Cooley Manufacturing Company, Holland, Mich., a corporation of Delaware Application January 13, 1941, Serial No. 374,226

2 Claims. (Cl. 126—292)

This invention relates to damper pivots or regulators which are adapted to be secured to an edge of a damper pivotally mounted within a conduit to adjust the amount of air, either hot or cold passing therethrough.

The object of this invention is to provide an improved retractable pivot which may be easily and quickly attached to the damper plate with a minimum effort and when so attached it will be a permanent part of the damper plate.

Another object of the invention is to provide a device which may be economically and cheaply made.

Another object of the invention is to provide a device in which the principal part of the structure is made from a single piece of sheet metal.

Another object of the invention is to provide a device in which the retractable bolt is threaded and a nut is provided to retain the bolt in its extended position and also to lock the damper in its adjusted position.

The shape of the pivot pin itself is adapted to have placed thereon an indicating arm which is parallel to the plate of the damper at all times both for the purpose of rotating the damper about its pivotal points and to indicate the position thereof within the conduit.

Other objects and purposes of the invention will appear more fully as the description proceeds.

To the accomplishment of the foregoing and related ends said invention, then, consists of the means hereinafter fully described and particularly pointed out in the claims.

The annexed drawing and following description set forth in detail certain means for carrying out our invention, said means constituting, however, but one of various ways in which the principle of the invention may be employed.

In said annexed drawing wherein like reference numerals refer to like parts throughout the various views:

Fig. 1 is an elevational view of one form of conduit showing the damper located therein and the pivot pin of our invention located at one side thereof.

Fig. 2 is an enlarged elevational view showing more clearly some of the details of the damper pivot.

Fig. 3 is a longitudinal section through the structure taken on a plane parallel to the damper.

Fig. 4 is a sectional view taken at right angles to the damper.

Fig. 5 is a perspective view of the structure itself, the retractable pivot pin being omitted therefrom.

Fig. 6 is a fragmentary end elevation of the damper pivot showing the regulating arm thereon.

Fig. 7 is a transverse section taken on a vertical plane through one end of the structure showing one form of securing means by which the device can be secured to the damper.

Fig. 8 is a view similar to Fig. 7 and showing the securing means in actual use, and Fig. 9 is a view similar to Figs. 7 and 8 but showing a different form of securing means.

Referring now more particularly to the drawing, while the conduit or pipe within which the damper is located may assume any desired shape, we have preferred to show in Fig. 1 a conduit having a substantially square cross section and wherein the two parallel vertical sides are indicated at 1, the top side at 2 and a bottom at 3. The damper itself, indicated at 4, substantially fills the space within the conduit when at right angles thereto and when in this position substantially all air will cease to flow therethrough. Openings are provided in each of the sides 1 through which the pivot pins located at the sides of the damper may extend so that the damper is mounted for a pivotal movement to regulate the flow of air through the pipe. At one side of the damper an ordinary fixed pivot pin may be secured or this pivot may consist of a rectractable pin 5 slidably mounted in a housing 6 on the plate 7 fixed to the damper similar to the retractable pivot at the other side of the damper hereafter described.

For the purpose of economy in manufacture, we have preferred to form the basic part of the structure which includes the two plates and the housing of a single length of metal, but it is to be understood that these various parts may be initially formed separately and later secured together without departing in any way from the spirit of the invention.

The basic structure comprises the two spaced apart plates 8 and 9 which may be integral with each other at one end thereof or secured together as at 10. The housing which is located longitudinally of the plate 9 comprises the top 11 having the downturned sides 12. One end thereof is closed by means of the plate 13, but its opposite end is permitted to remain open. Adjacent the open end of the housing it is provided with outwardly extending ears 14 having openings 15 therein. Corresponding openings 16 and 17 are located in the spaced apart plates 8 and 9 in direct alinement with the openings 15, and retaining means in the form of drive screws 18 may be inserted within the openings 15 in the ears 14 so that when a damper is received between the plates 8 and 9, the drive screws may be driven into it thereby firmly securing the entire structure thereto. If desired the drive screws may be provided with slots 19 in their upper ends so that they may be removed if necessary.

We do not wish to be limited to the specific retaining means disclosed in Figs. 7 and 8 and other means such as the rivets 20 in Fig. 9 may be utilized equally as well.

In the form shown in Fig. 7 it has been found practical to insert the drive screws as indicated where they are frictionally held in place ready for use and in which condition the structure may be packed and shipped so that when it is to be assembled later and secured to the damper all that is necessary is to drive the screws through the damper plate. These screws need not be packed separately, and therefore the shipping as well as the assembly of the structure will be facilitated.

In each side 12 of the housing there is provided an elongated slot 21. The retractable pivot pin 22 is located within the housing and at its rear end is provided with outwardly extending ears 23, which extend through the slots 21 and prevent its removal as well as limiting its outward movement by having the ears 23 bear against the forward end of the slots 21. Also within the housing is located a compression spring 24 which bears at one end against the inner end of the pivot pin 22 and at its other end against the plate 13 which closes the opposite end of the housing. It will be evident that the spring 24 urges the pivot pin 22 outwardly at all times but a force inwardly against the outer end of the pivot pin will compress the spring and permit inward movement of the pin. This is obviously necessary for installation purposes so that the pin may be retracted when the damper plate is inserted within the conduit but may extend outwardly through the opening in the side of the conduit and, together with the corresponding pin 5 at the opposite side of the damper, will form pivotal points about which the damper may rotate.

In actual use, although not necessarily, we prefer to use a washer 25 located between the end of the housing and the inner side of the pipe 1. Another washer 26, preferably of the form shown in Figs. 2 and 3, is placed on the outer side of the pipe and around the pivot pin. The indicating or adjusting arm 27 is then placed over the pivot pin and is secured in place by means of the nut 28 which engages the threads 29 around the pivot pin.

The pin itself is preferably elongated in cross section so that it has two parallel sides. The opening in the end of the indicating arm 27 is also of this shape so that any rotative movement imparted thereto will also rotate the pivot pin together with the damper plate to which the entire structure is secured. The longest dimension of the pin 22 will be parallel to the plane of the damper so that when the arm 27 is located thereon it also will be in the same plane therewith. This is done so that a glance at the arm 27 will indicate the position of the damper within the conduit. Also the position of such damper may be changed by rotating said arm.

It is to be noted that the two plates 8 and 9, the housing, and the plate 13 over the closed end thereof, as shown in the drawing are all formed of a single length of metal and for this reason the structure is extremely economical to manufacture. The space between the two plates 8 and 9 being closed at one end thereof will limit the distance which the edge of the damper may be moved therein and will locate the structure properly with respect thereto.

Other modes of applying the principle of our invention may be used instead of the one here described, change being made as regards the structure herein disclosed provided, however, that the means stated by any of the following claims or the equivalent of such stated means be employed.

We, therefore, particularly point out and distinctly claim as our invention:

1. The combination with a damper of a damper pivot comprising an integrally formed housing consisting of a plate located adjacent said damper and extending inwardly from an edge thereof and thence turned upwardly to form the inner end of the housing and thence turned outwardly and having sides turned downwardly and terminating adjacent said plate, said outer end of said housing being normally disconnected from said plate, fastening means extending through said housing, said plate and said damper near its outer portions and acting to connect the outer end of said housing to said plate and said plate to said damper and a retractable pivot located within said housing and extending outwardly therefrom.

2. The elements in combination defined in claim 1, in which the lower edges of the sides of said housing are provided with elongated recesses adjacent said plate and said pivot has radially extending ears extending into an slidable in said recesses to limit the movement of the pivot.

LOYD E. HEASLEY.
WILLIAM C. DE ROO.